Nov. 9, 1926.
F. E. REUTER
1,606,179
SPARK PLUG TESTING SYSTEM AND WATER CIRCULATING INDICATOR
Filed Nov. 24, 1924    2 Sheets-Sheet 2
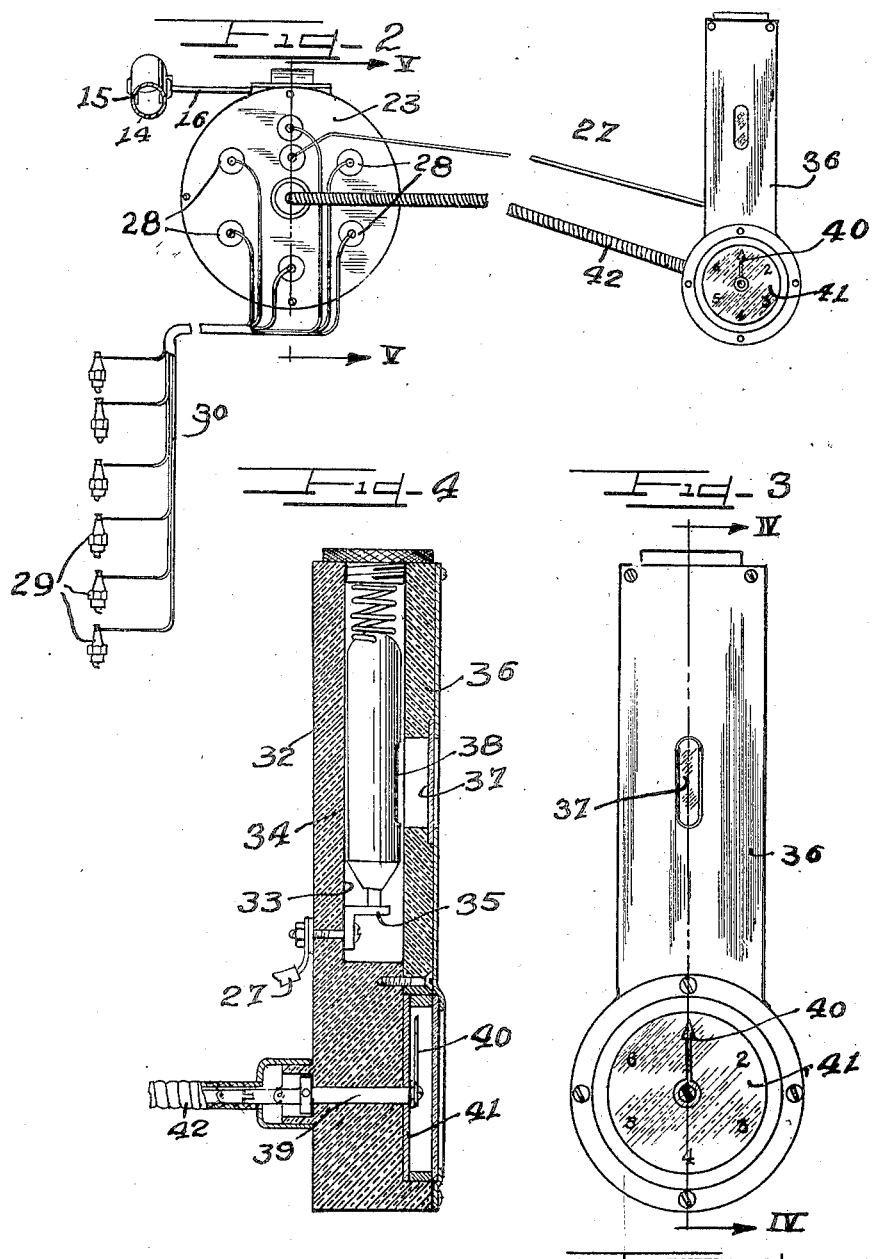
Inventor
Fredricka E. Reuter
by Charles A. Keller
Attys.

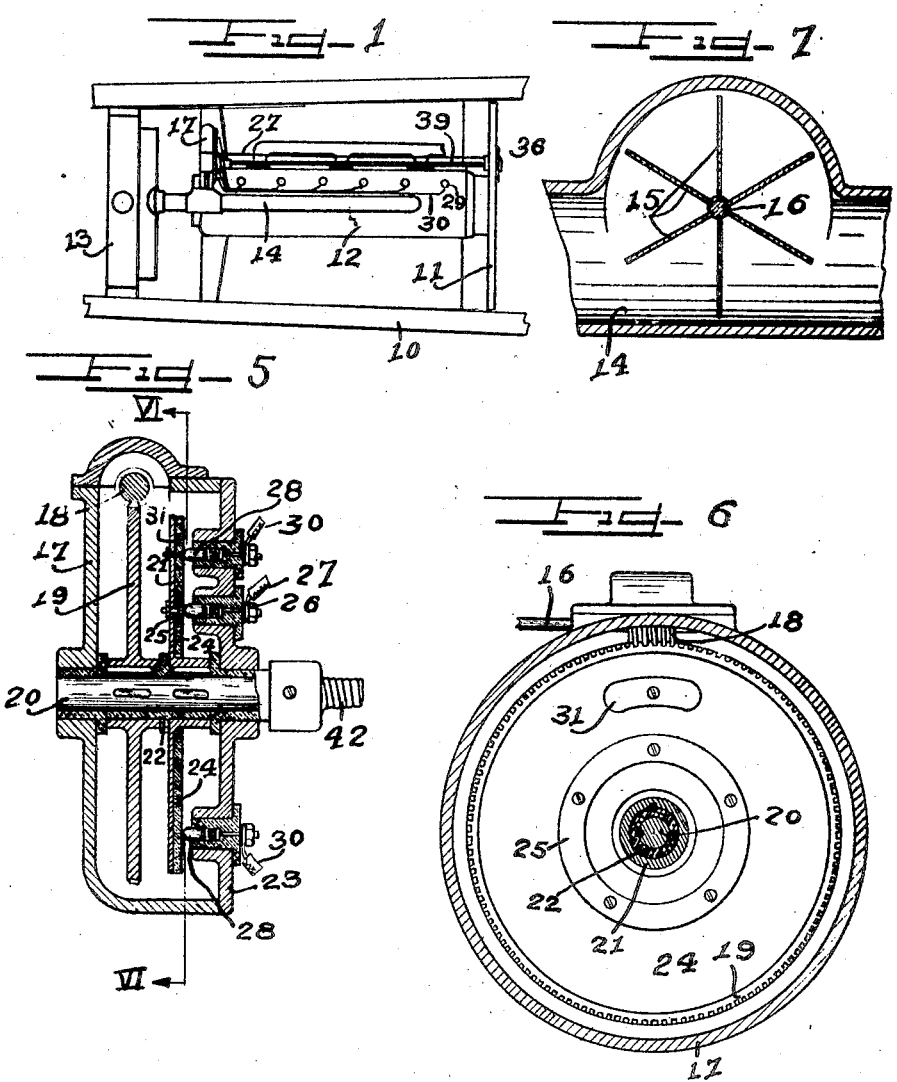

Patented Nov. 9, 1926.

1,606,179

UNITED STATES PATENT OFFICE.

FREDRICKA E. REUTER, OF CHICAGO, ILLINOIS.

SPARK-PLUG-TESTING SYSTEM AND WATER-CIRCULATING INDICATOR.

Application filed November 24, 1924. Serial No. 751,770.

This invention relates to spark plug testing apparatus and particularly apparatus adapted to utilize a neon gas spark indicator for sequentially indicating the condition of all the spark plugs of an internal combustion engine.

In my co-pending application, Serial No. 712,503, filed May 12, 1924, I have shown a manually actuated device adapted to successively bring a single neon tube into connection with the various spark plugs. Because of the tediousness of such an operation with a large number of cylinders, my co-pending application, Serial No. 740,476, filed September 29, 1924, was developed to simultaneously connect all the spark-plugs to individual indicators. It is an object of the present invention to connect an indicating mechanism to a mechanism driven by some essential function of the engine, such for example as the water circulating system or the oil circulating system, in order to provide a continuous indication of the proper functioning of both the spark plugs and the essential circulating system utilized as a driving medium.

It is also an object of this invention to provide a device of the class described wherein a series of indications will be given for each spark plug before passing on to the next plug. If the indicator mechanism were driven at or near engine speed, the indications would have little value as they would occur so rapidly that it would be impossible to identify a given indication with the particular spark plug. By greatly reducing the speed of movement of the indicator mechanism, identification of the individual spark plug is made easy and a series of indications is given for one plug before the mechanism advances to the next one, thus clearly showing defects such as uneven or intermittent firing by the spark plug.

Other and further important objects of this invention will be apparent from the disclosures in the specification and the accompanying drawings.

The invention (in a preferred form) is illustrated in the drawings and hereinafter more fully described.

On the drawings:

Figure 1 is a plan view of the power plant of a vehicle showing one form of the device of this invention installed in connection therewith.

Figure 2 is a more detailed view of the device alone.

Figure 3 is an enlarged elevation view of the indicator intended to be mounted on the instrument board of a vehicle.

Figure 4 is an enlarged section on line 4—4 of Figure 3.

Figure 5 is an enlarged section on line 5—5 of Figure 2.

Figure 6 is a section on line 6—6 of Figure 5.

Figure 7 is a section of the indicator driving mechanism or fluid motor.

As shown on the drawings:

The power plant outlined in Figure 1 comprises a vehicle frame 10 supporting an instrument board 11 above an internal combustion engine 12 having a water cooling system connected to a radiator 13. The water outlet 14 from the top of the engine to the radiator is provided with a water motor or driving unit for the apparatus of this invention which may comprise a rudimentary impulse turbine 15 mounted on a shaft 16. The water circulation of the engine has been chosen for the specific embodiment of this invention, although it is to be understood that other essential circulating fluids may be utilized if it is desired to obtain a continuous indication of the proper functioning thereof. The advantage of incorporating the fluid motor in the hot water outlet from the engine instead of in the cold water inlet resides in the fact that a low water level or the generation of steam in the cylinder jacket, indicating an overheated engine, results in stoppage of the driving motor and therefore of the indicating mechanism hereinafter to be described.

The shaft 16 extends into a distributor casing 17, carrying a worm 18 on the end thereof which meshes with a worm gear 19 driving a shaft 20 within the casing. This shaft carries a distributing disc 21 having insulating bushings 22 separating it from the shaft as well as from the cover 23, worm gear 19 and casing 17. The disc 21 is preferably faced with an insulating compound 24 in which is inserted an annular metal ring 25 serving to make continuous electrical contact with a spring pressed brush 26 connected by means of the wire 27 with the indicating instrument. A series of brushes 28 are evenly spaced in a circle on the cover 23, one brush being provided for each spark plug 29 of the engine and being connected thereto by individual wires 30. A segment 31 is set into the insulation of the distributing disc in a position to contact the various brushes 28, the segment being preferably of the greatest length possible without contacting two brushes at the same time, in order to give as many indications for each plug as possible. The segment 31 is of course in electrical connection with the ring 25 thereby completing the circuit from one spark plug 29 and its wire 30, to a brush 28, thence to the segment 31 and ring 25, brush 26 and wire 27, to the indicating instrument. All these connections are carefully insulated against grounding the spark plug; no return circuit being necessary with neon gas indicators, which do not short circuit or otherwise interfere with the normal operation of the spark plugs.

The indicator proper comprises a body 32 adapted to be mounted on the instrument board and containing a recess 33 adapted to receive a neon gas spark tester 34 which is spring urged into electrical contact with a terminal 35 to which the wire 27 is connected. A cover 36 is provided for the indicator recess, a window 37 being located adjacent the indicator window 38.

In order to show what particular spark plug is being tested at any particular moment, a shaft 39 carrying a pointer 40 is mounted in the body below the neon gas indicator and is adapted to rotate over a dial 41 having suitable indicia for the different plugs. A flexible shaft 42 is connected to the end of the distributor shaft 20 and drives the shaft 39 in synchronism with the indicator. This flexible shaft may be of the well-known speedometer drive shaft construction, as shown.

Because of the great speed reduction ratio between the engine speed and that of the distributor, the time during which the segment 31 connects the indicator to one particular spark plug will be sufficient to register a large number of flashes from the plug, thus giving an accurate idea of the continuity of working of the plug as well as giving ample time for an identification of the plug being tested. For the purpose mentioned, a glance at the pointer 40, which is driven by the distributor, is sufficient, and at the same time the movement of this pointer is a guarantee of proper functioning of the fluid circulation system. Because a large number of indications are taken from a single plug no attempt need be made to synchronize the movement of the distributor with the engine speed. All that is necessary is to wire the distributor to the plugs in the order shown on the dial 41.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. A spark plug tester for internal combustion engines, comprising a fluid motor driven by a circulating fluid in said engine, a distributor driven by the motor, connections from individual spark plugs to separate points in said distributor, a collector in said distributor, and a spark indicator connected thereto.

2. A spark plug tester for internal combustion engines, comprising a fluid motor driven by a circulating fluid in said engine, a distributor driven by the motor, connections from individual spark plugs to separate points in said distributor, a collector in said distributor, a spark indicator connected thereto, and means driven by the distributor adapted to indicate the particular spark plug being tested.

3. In combination with an internal combustion engine and a fluid circulating system thereof, a fluid motor, a series of brushes connected to individual spark plugs of the engine, contact means driven by the fluid motor adapted to make successive contact with said brushes, and a spark plug tester connected thereto.

4. In combination with an internal combustion engine and a fluid circulating system thereof, a fluid motor, a series of brushes connected to individual spark plugs of the engine, contact means driven by the fluid motor adapted to make successive contact with said brushes, a spark plug tester connected thereto, and means in connection with said contact means adapted to indicate the spark plug being tested.

5. In combination with a fluid circulating system of an internal combustion engine, a fluid motor, a spark plug tester, means sequentially connecting the tester to the spark plugs driven by said motor, and means indicating fluid circulation and the spark plug under test.

In testimony whereof I have hereunto subscribed my name.

FREDRICKA E. REUTER.